United States Patent
Rehmer et al.

(10) Patent No.: US 10,218,159 B2
(45) Date of Patent: Feb. 26, 2019

(54) ELECTRICAL DISTRIBUTION SYSTEM INCLUDING NEUTRAL CONNECTION DEVICE AND METHODS OF ASSEMBLING SAME

(71) Applicant: ABB Schweiz AG, Baden (CH)

(72) Inventors: Dennis James Rehmer, Bristol, CT (US); Tyler Braden Diomedi, Plainville, CT (US); Justin Dubrosky, Bristol, CT (US); Byron Horner, Mebane, NC (US); Jeremy Robert Baillargeon, Southington, CT (US); Lee Malmud, Cornelius, NC (US); Mariusz Duda, Berlin, CT (US); Elwood Combs, Mebane, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/874,497

(22) Filed: Jan. 18, 2018

(65) Prior Publication Data
US 2018/0331513 A1 Nov. 15, 2018

Related U.S. Application Data

(60) Provisional application No. 62/504,360, filed on May 10, 2017.

(51) Int. Cl.
*H02B 1/48* (2006.01)
*H04B 1/20* (2006.01)
(Continued)

(52) U.S. Cl.
CPC ............. *H02B 1/48* (2013.01); *H01R 25/142* (2013.01); *H01R 25/145* (2013.01); *H02B 1/20* (2013.01); *H02B 1/04* (2013.01)

(58) Field of Classification Search
CPC ........... H02B 1/04–1/0565; H02B 1/48; H01R 25/142; H01R 25/145
(Continued)

(56) References Cited

U.S. PATENT DOCUMENTS

RE26,737 E * 12/1969 Jorgensen .............. H02B 1/056
174/99 R
3,585,456 A 6/1971 Phillips, Jr.
(Continued)

FOREIGN PATENT DOCUMENTS

| EP | 897207 B1 | 9/2002 |
|---|---|---|
| WO | 2007017573 A1 | 2/2007 |
| WO | 2009048427 A1 | 4/2009 |

*Primary Examiner* — Zachary Pape
(74) *Attorney, Agent, or Firm* — Barnes & Thornburg LLP

(57) ABSTRACT

An electrical distribution system is provided. The system includes a bus bar assembly including a neutral bus bar and a plurality of power bus bars. The system further includes a circuit breaker including a first end and a second end opposite the first end, the first end including a plurality of first conductive terminals electrically coupled to respective power bus bars, the second end including a plurality of second conductive terminals located a first distance from the plurality of power bus bars. The system further includes a neutral connection device including a first conductive terminal electrically coupled to the neutral bus bar, a second conductive terminal, and a conductive component, the neutral connection device second conductive terminal located a second distance from the neutral bus bar, the second distance one of greater than the first distance and equal to the first distance.

20 Claims, 12 Drawing Sheets

(51) Int. Cl.
*H01R 25/14* (2006.01)
*H02B 1/20* (2006.01)
*H02B 1/04* (2006.01)

(58) Field of Classification Search
USPC ......... 361/633–634, 636, 652–655, 656, 673
See application file for complete search history.

(56) References Cited

U.S. PATENT DOCUMENTS

| | | | |
|---|---|---|---|
| 5,166,861 A * | 11/1992 | Krom | H02B 1/056 |
| | | | 174/16.2 |
| 5,214,314 A | 5/1993 | Dillard | |
| 7,449,645 B1 * | 11/2008 | Flegel | H01R 4/64 |
| | | | 200/50.32 |
| 7,508,653 B2 | 3/2009 | Parlee | |
| 7,692,332 B2 | 4/2010 | Nordman | |
| 7,957,122 B2 * | 6/2011 | Sharp | H02B 1/056 |
| | | | 174/67 |
| 8,693,169 B2 | 4/2014 | Diaz | |
| 9,203,231 B2 * | 12/2015 | Samuelson | H02H 3/16 |
| 9,948,043 B2 * | 4/2018 | Mittelstadt | H01R 4/36 |
| 9,979,164 B2 * | 5/2018 | Baillargeon | H02B 1/20 |
| 2016/0141134 A1 | 5/2016 | Pearson | |
| 2017/0025830 A1 | 1/2017 | Cordova Diaz | |
| 2017/0033523 A1 | 2/2017 | Mittelstadt | |

* cited by examiner

ELECTRICAL DISTRIBUTION SYSTEM INCLUDING NEUTRAL CONNECTION DEVICE AND METHODS OF ASSEMBLING SAME

CROSS-REFERENCE TO RELATED APPLICATIONS

This application claims the benefit of U.S. Provisional Patent Application No. 62/504,360, filed on May 10, 2017, the disclosure of which is hereby incorporated by reference in its entirety.

BACKGROUND

The field of the disclosure relates generally to electrical distribution systems, and more particularly, to electrical distribution systems including a neutral connection device.

In at least some known electrical distribution systems, components of the electrical distribution apparatus, such as circuit breakers, are connected to power connectors to electrically power devices. For example, power connectors include terminals, lugs, bus bars, and other connectors. A first end of the circuit breaker connects to the power connectors and a second end of the circuit breaker is available for connecting to another power connector. However, in at least some known electrical distribution systems, the components do not connect to a neutral component of the electrical distribution system. Accordingly, an operator must provide a connection to the neutral component when the second end of the devices are connected. However, the neutral components may be difficult to access when the components are connected to the power connectors. In addition, at least some known neutral components have a different form factor than other phases of the electrical distribution apparatus. Accordingly, the cost required to assemble the electrical distribution systems is increased to accommodate the neutral components, which require different connections than the other phases of the electrical distribution apparatus. In addition, the size of at least some known bus bar assemblies are increased due to the location of the neutral connection.

Accordingly, a need exists for an electrical distribution system including a neutral component that has a more uniform form factor and is more easily accessible to operators.

BRIEF DESCRIPTION

In one aspect, an electrical distribution system is provided. The electrical distribution system includes a bus bar assembly including a plurality of bus bars including a neutral bus bar and a plurality of power bus bars, wherein an insulating material is located between adjacent bus bars of the plurality of bus bars. The system further includes a circuit breaker coupled to the bus bar assembly and including a first end and a second end opposite the first end, the first end including a plurality of first conductive terminals electrically coupled to respective power bus bars of the plurality of power bus bars, the second end including a plurality of second conductive terminals, each second conductive terminal of the plurality of second conductive terminals electrically coupled to an associated first conductive terminal of the plurality of first conductive terminals, the plurality of second conductive terminals located a first distance from the plurality of power bus bars. The system further includes a neutral connection device coupled to the bus bar assembly, the neutral connection device including a first end including a first conductive terminal electrically coupled to the neutral bus bar, a second end opposite the neutral connection device first end, the second end including a second conductive terminal operable to electrically couple the neutral connection device to at least one electrical device, and a conductive component extending between and electrically coupling the neutral connection device first and second conductive terminals, the neutral connection device second conductive terminal located a second distance from the neutral bus bar, the second distance one of greater than the first distance and equal to the first distance.

In yet another aspect, a method of assembling an electrical distribution system is provided. The system includes a bus bar assembly, the bus bar assembly including a plurality of bus bars including a neutral bus bar and a plurality of power bus bars, an insulating material located between adjacent bus bars of the plurality of bus bars. The method includes coupling a circuit breaker to the bus bar assembly, the circuit breaker including a first end and a second end opposite the first end, the first end including a plurality of first conductive terminals electrically coupled to respective power bus bars of the plurality of power bus bars, the second end including a plurality of second conductive terminals, each second conductive terminal of the plurality of second conductive terminals electrically coupled to an associated first conductive terminal of the plurality of first conductive terminals, the plurality of second conductive terminals located a first distance from the plurality of power bus bars. The method further includes coupling a neutral connection device to the bus bar assembly, the neutral connection device including a first end including a first conductive terminal electrically coupled to the neutral bus bar, a second end opposite the neutral connection device first end, the second end including a second conductive terminal operable to electrically couple the neutral connection device to at least one electrical device, and a conductive component extending between and electrically coupling the neutral connection device first and second conductive terminals, the neutral connection device second conductive terminal located a second distance from the neutral bus bar, the second distance one of greater than the first distance and equal to the first distance.

Although specific features of various embodiments may be shown in some drawings and not in others, this is for convenience only. Any feature of any drawing may be referenced and/or claimed in combination with any feature of any other drawing.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Exemplary embodiments of distribution systems and methods of manufacturing distribution systems are described herein. The distribution systems generally include a neutral connection device configured to couple to a neutral bus bar of a bus bar assembly. The neutral connection device is positioned proximate an electrical device (e.g., a circuit breaker) connected to power bus bars of the bus bar assembly, and provides a connection point aligned with an end of the electrical device. Accordingly, the neutral connection device facilitates coupling electrical devices to the electrical distribution apparatus.

Figure 1:
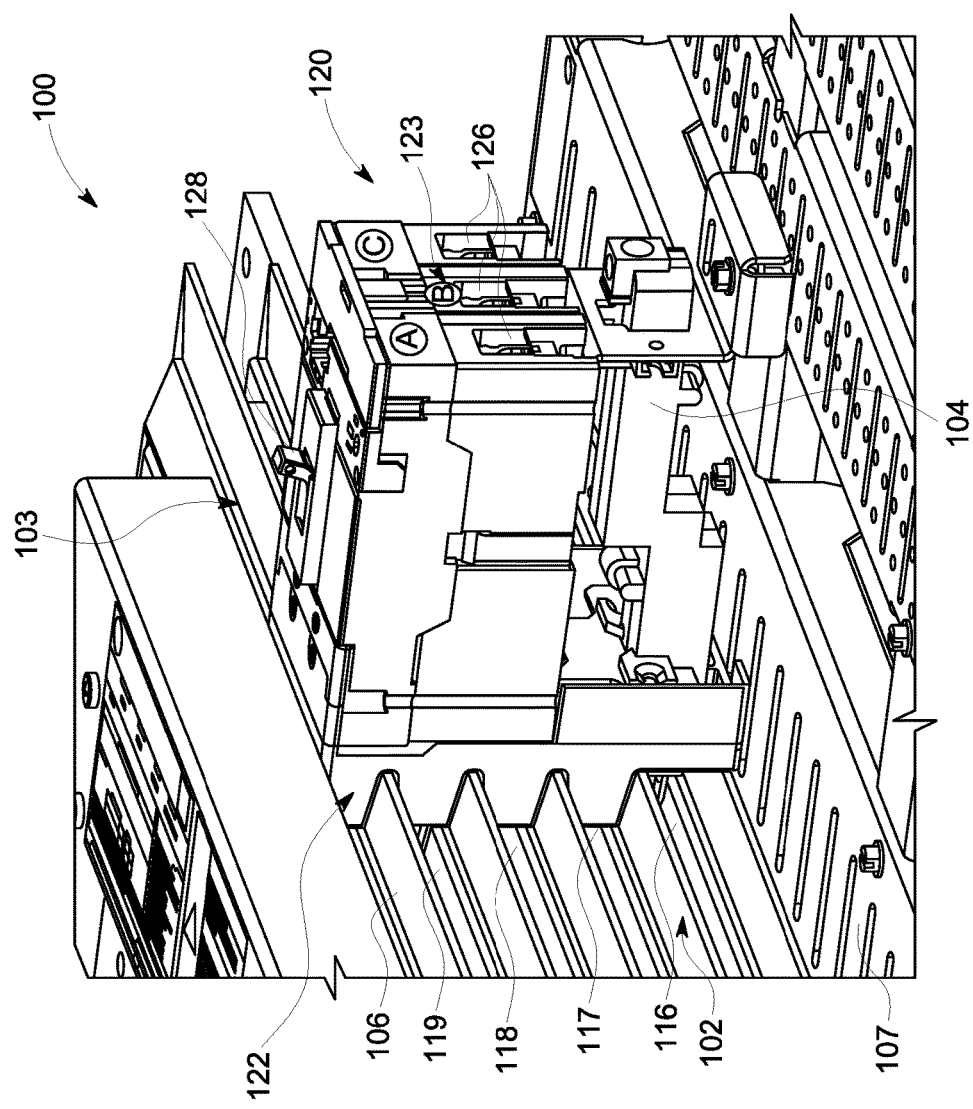
FIG. 1 is a perspective view of a portion of an exemplary electrical distribution system.
Figure 2:
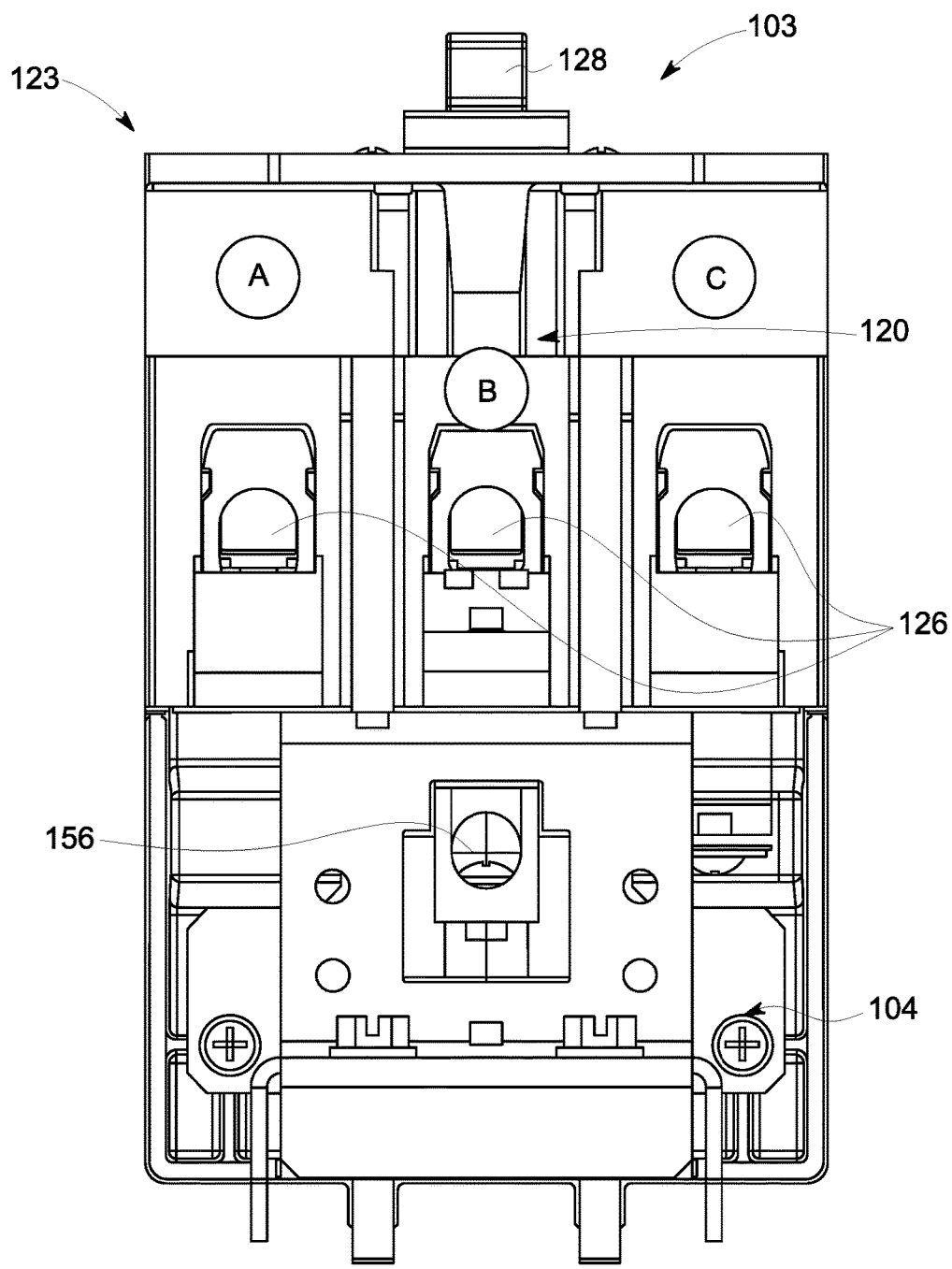
FIG. 2 is a front view of a portion of the electrical distribution system shown in FIG. 1.

FIG. 1 is a perspective view of an exemplary electrical distribution system 100. FIG. 2 is a front view of a portion of electrical distribution system 100 shown in FIG. 1. A coordinate system 10 includes an X-axis, a Y-axis, and a Z-axis (shown in FIG. 2). Electrical distribution system 100 includes a bus bar assembly 102, a circuit breaker 103, and a neutral connection device 104. Circuit breaker 103 is coupled to bus bar assembly 102. In alternative embodiments, electrical distribution system 100 includes any other electrical device coupled to bus bar assembly 102 that enables electrical distribution system 100 to operate as described herein. For example, in some embodiments, the electrical device includes, for example and without limitation, ground fault circuitry, current transformers, communications, human machine interface (HMI) and display components, circuit interrupting devices, and/or DC/AC power components.

In the exemplary embodiment, circuit breaker 103 includes a first end 122, a second end 123, a top, a bottom, and sides, in reference to the orientation shown in FIG. 1. First end 122 is adjacent bus bar assembly 102 and second end 123 is opposite first end 122. Top, bottom, and sides of circuit breaker 103 extend between first end 122 and second end 123. For each phase, circuit breaker 103 includes a first conductive terminal 124 at first end 122, a second conductive terminal 126 at second end 123, and a conductive component (not shown extending between an associated first conductive terminal 124 and second conductive terminal 126. Accordingly, in the exemplary embodiment, circuit breaker 103 includes three first conductive terminals 124 and three second conductive terminals 126. An operating mechanism 128 is positioned on top of circuit breaker 103 and configured to interrupt current. In alternative embodiments, circuit breaker 103 has any configuration that enables electrical distribution system 100 to operate as described herein.

Also, in the exemplary embodiment, neutral connection device 104 is coupled to bus bar assembly 102 adjacent first end 122 of circuit breaker 103. In particular, neutral connection device 104 is coupled to a neutral component or neutral bus 116 of bus bar assembly 102. In the exemplary embodiment, neutral connection device 104 is coupled to bus bar assembly 102 beneath circuit breaker 103 and extends along bottom of circuit breaker 103. In alternative embodiments, neutral connection device may be coupled to bus bar assembly 102 in any configuration with respect to circuit breaker 103 that enables electrical distribution system 100 to operate as described herein. For example, neutral connection device 104 may be coupled to bus bar assembly on top of circuit breaker 103 or on a side of circuit breaker 103.

In addition, in the exemplary embodiment, bus bar assembly 102 includes a plurality of bus bars 106 and a bus bar support 107. Bus bar support 107 may be, for example, a portion of a panelboard. Bus bars 306 are separated from each other by insulating material. Plurality of bus bars 106 includes bus bars 116, 117, 118 and 119 coupled to bus bar support 107. Bus bars 116, 117, 118, and 119 are arranged in a stacked configuration. That is, bus bars 116, 117, 118, and 119 are aligned with one another in a vertical direction. Moreover, each bus bar 116, 117, 118, and 119 is spaced from each adjacent bus bar in vertical direction. Accordingly, bus bars 116, 117, 118, and 119 define slots therebetween. Each bus bar 116, 117, 118, and 119 is coupleable to one phase of a multi-phase power supply. In the exemplary embodiment, bus bar assembly 102 includes a four-pole bus bar stack. During operation of electrical distribution system 100, bus bar assembly 102 is configured to provide current through neutral connection device 104 and/or circuit breaker 103. Specifically, in the exemplary embodiment, a first bus bar 116, or neutral bus bar 116, is configured to provide current through neutral connection device 104. Further, in the exemplary embodiment, bus bars 117, 118, and 119 are arranged to provide a current through circuit breaker 103 by electrically coupling to bus bars 117, 118, and 119 using first conductive terminals 124. Specifically, bus bars 117, 118, and 119 supply three-phase electric power (with each bus bar electrically coupled to different phase). Accordingly, bus bars 117, 118, and 119 may be referred to as power bus bars (in contrast to neutral bus bars). In alternative embodiments, electrical distribution system 100 includes any bus bar assembly 102 that enables electrical distribution system 100 to operate as described herein.

In the exemplary embodiment, neutral connection device 104 is physically coupled to circuit breaker 103 such that circuit breaker 103 and neutral connection device 104 are coupleable to bus bar assembly 102 as a unit. In alternative embodiments, neutral connection device 104 and circuit breaker 103 are coupleable to bus bar assembly 102 as separate components. In further alternative embodiments, neutral connection device 104 is integrated with circuit breaker 103 to form a singular unit.

Also, in the exemplary embodiment, neutral connection device 104 includes a first conductive terminal 155 electrically coupleable to neutral bus bar 116, a second conductive terminal 156 for electrically coupling neutral connection device to an electrical load or other electrical device, and a conductive component 114 extending between first conductive terminal 155 and second conductive terminal 156. In alternative embodiments, neutral connection device 104 includes any power connector that enables neutral connection device 104 to operate as described herein. For example, in some embodiments, neutral connection device 104 includes multiple second conductive terminals 156 to facilitate electrically coupling neutral connection device 104 to more than one electrical device, such as multiple circuit breakers.

Figure 3:
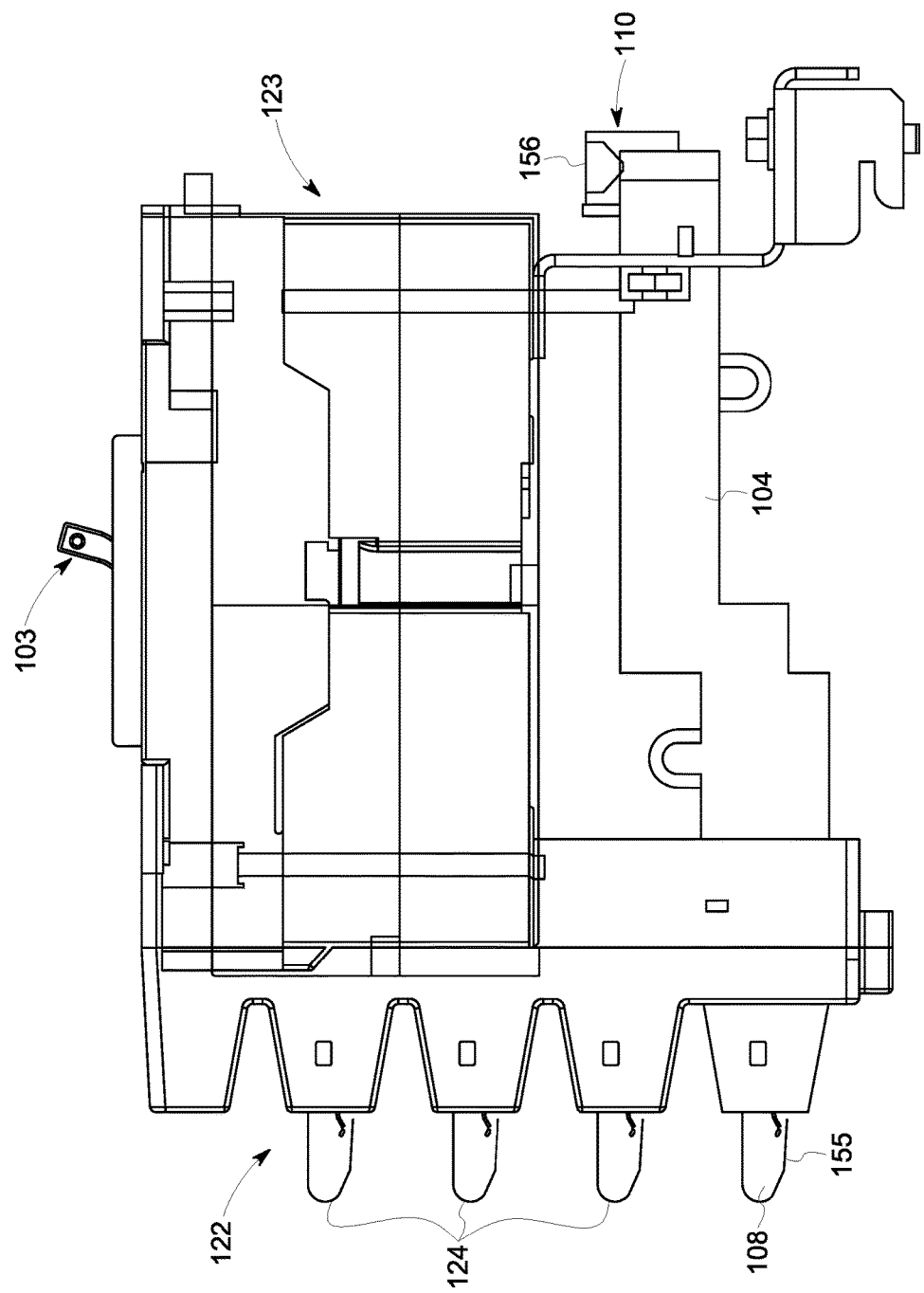
FIG. 3 is a side view of a portion of the electrical distribution system shown in FIGS. 1 and 2.
Figure 4:
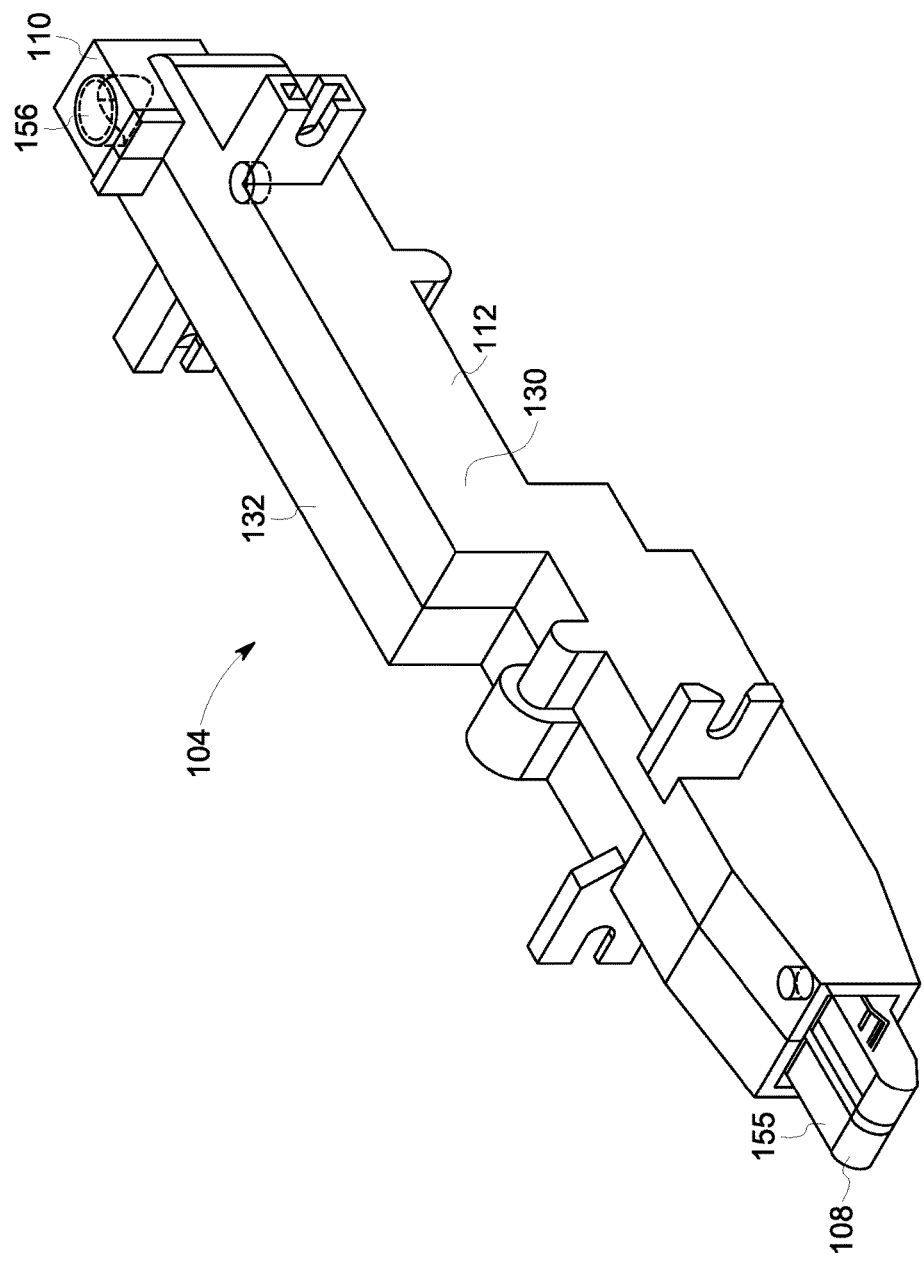
FIG. 4 is a perspective view of a neutral connection device of the electrical distribution system shown in FIG. 1.
Figure 5:
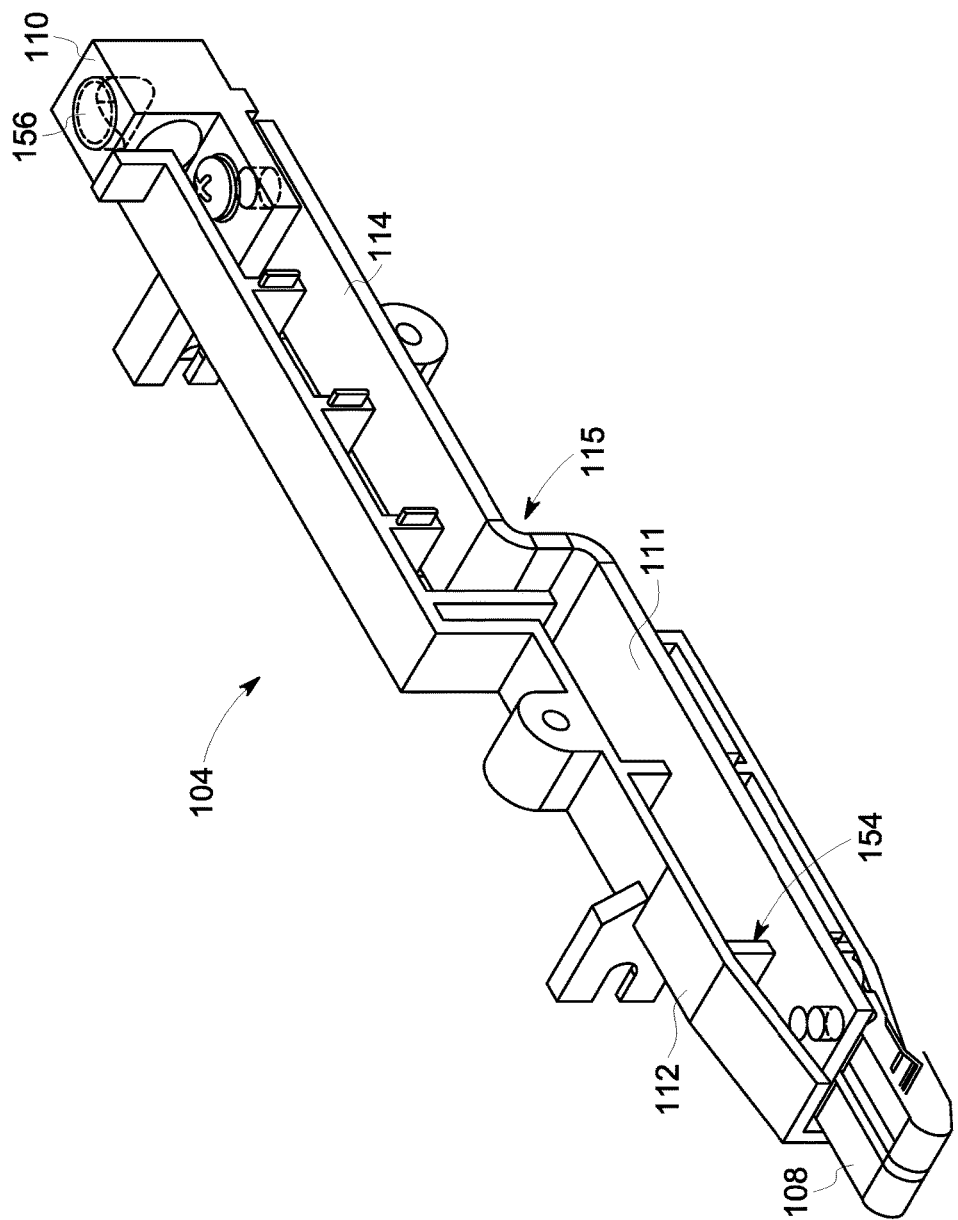
FIG. 5 is a perspective view of a portion of the neutral connection device shown in FIG. 4.

FIG. 3 is a side view of neutral connection device 104 connected to bus bar assembly 102. FIG. 4 is a perspective view of neutral connection device 104 of electrical distribution system 100. FIG. 5 is a perspective view of a portion of neutral connection device 104. In the exemplary embodiment, neutral connection device 104 includes a first end 108, a second end 110, a casing 112, and a conductive component 114 (shown in FIG. 5). Conductive component 114 extends from first conductive terminal 155 at first end 108 to second conductive terminal 156 second end 110 and forms a current flow path 111 between first conductive terminal 155 and second conductive terminal 156. Accordingly, in the exemplary embodiment, second conductive terminal 156 of neutral connection device 104 is spaced from bus bar assembly 102 and substantially in vertical alignment with second conductive terminals 126 of circuit breaker 103. In alternative embodiments, second conductive terminal 156 is any distance from circuit breaker 103 that enables electrical distribution system 100 to operate as described herein. For example, in some embodiments, neutral connection device 104 extends beyond circuit breaker 103, such that second conductive terminal 156 of neutral connection device 104 is a greater distance from bus bar assembly 102 that second conductive terminals 126 of circuit breaker 103. In addition, neutral connection device 104 allows bus bar assembly 102 to have a decreased footprint. In particular, neutral connection device 104 occupies space adjacent circuit breaker 103.

In the exemplary embodiment, conductive component 114 defines current flow path 111 to accommodate operation of circuit breaker 103. In alternative embodiments, current flow path 111 of neutral connection device 104 is oversized to accommodate increased neutral currents. Further, in the exemplary embodiment, conductive component 114 includes an S-shaped portion 115 positioned about midway along the length of conductive component 114. Specifically, S-shaped portion is arranged such that second end 110 of neutral connection device 104 is positioned closer to circuit breaker 103 than first end 108 of neutral connection device 104. In the exemplary embodiment, conductive component 114 is comprised of a copper material. In alternative embodiments, neutral connection device 104 includes any conductive component 114 that enables neutral connection device 104 to operate as described herein.

Figure 6:
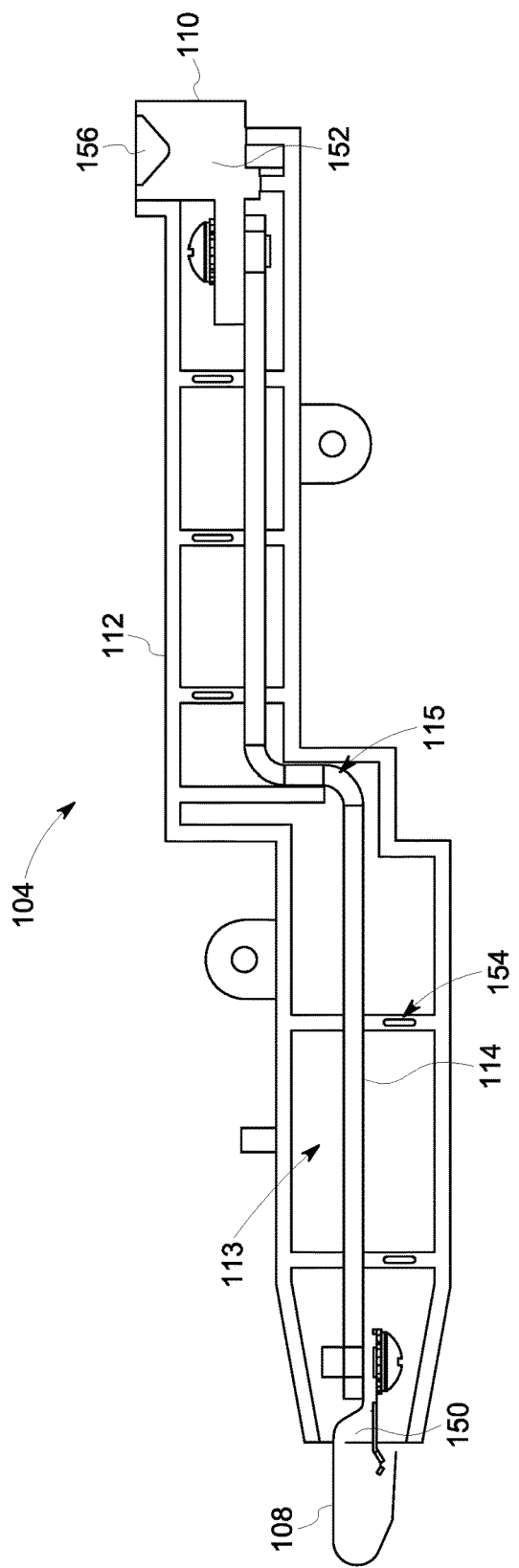
FIG. 6 is a side view of a portion of the neutral connection device shown in FIG. 4.

FIG. 6 is a side view of a portion of neutral connection device 104. In the exemplary embodiment, casing 112 includes an insulating material, such as molded plastic, and encloses conductive component 114. Casing 112 defines an interior space 113, a first opening 150, and a second opening 152. Conductive component 114 is positioned within interior space 113 and extends from first opening 150 to second opening 152. Casing 112 includes structural members 154 supporting conductive component 114 within interior space 113. In the exemplary embodiment, casing 112 includes a first portion 130 and a second portion 132 detachably coupled together (shown in FIG. 4). In alternative embodiments, casing 112 is unitarily formed. In further alternative embodiments, neutral connection device 104 includes any casing 112 that enables neutral connection device 104 to operate as described herein.

In alternative embodiments, electrical distribution system 100 includes a protective barrier to provide restricted or selective access to power connectors. In further embodiments, neutral connection device 104 is configured to restrict access to the power connectors in coordination with the protective barrier.

Figure 7:
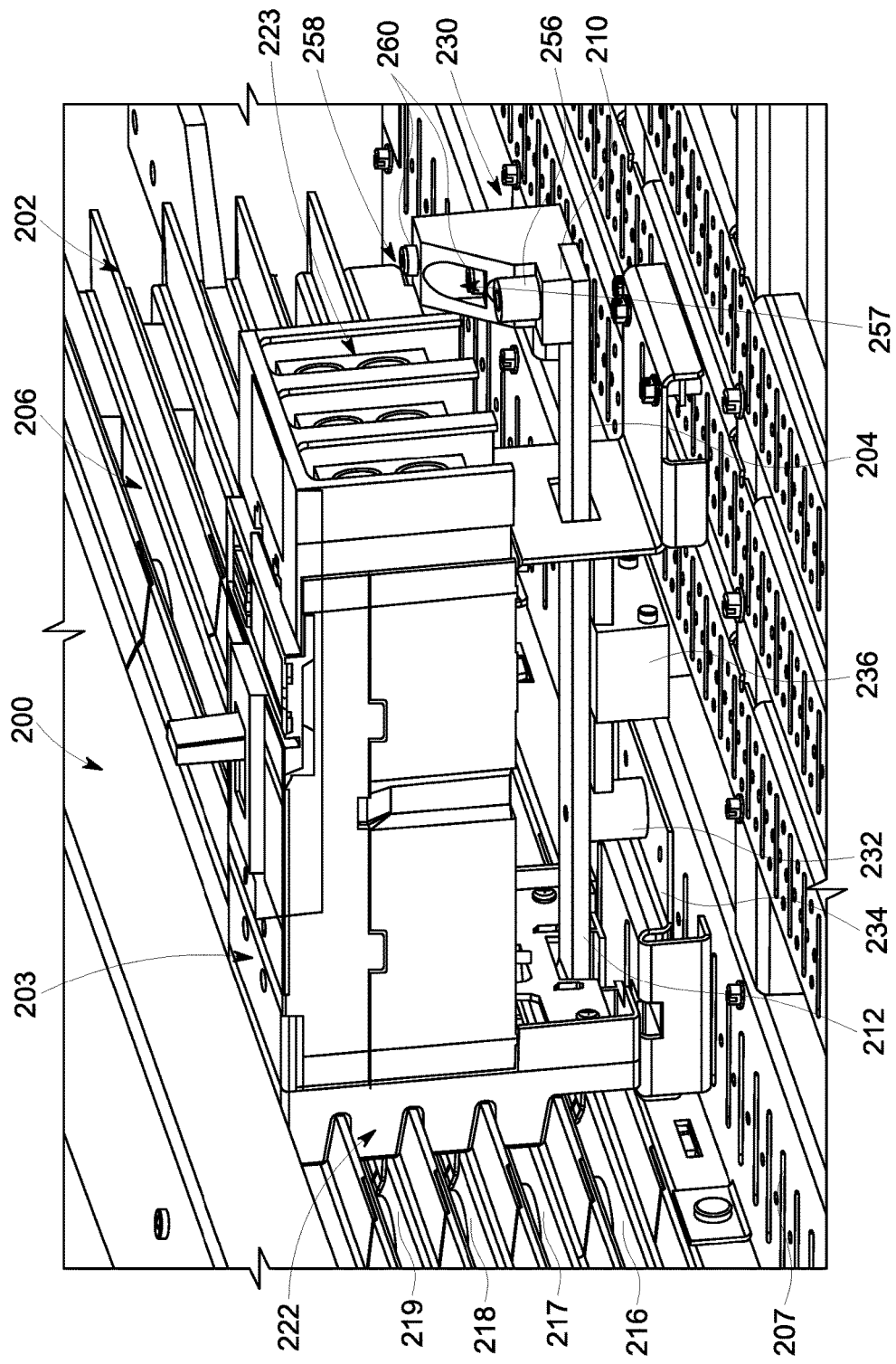
FIG. 7 is a perspective view of an exemplary electrical distribution system including a neutral connection device positioned below an electrical device.
Figure 8:
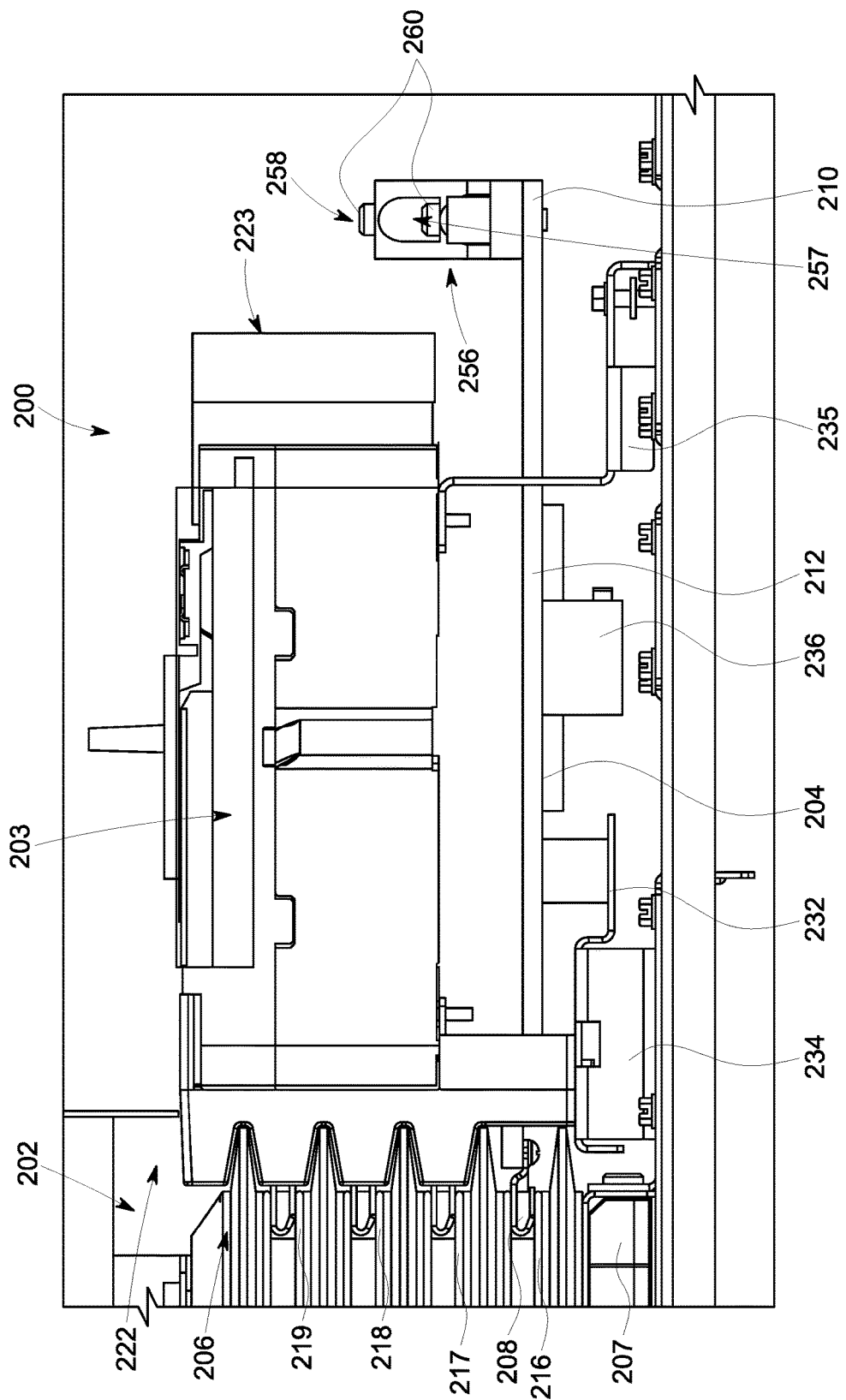
FIG. 8 is a side view of the electrical distribution system shown in FIG. 7.

FIG. 7 is a perspective view of an exemplary electrical distribution system 200 including an alternative neutral connection device 204 positioned below a circuit breaker 203. FIG. 8 is a side view of electrical distribution system 200. Electrical distribution system 200 includes neutral connection device 204, circuit breaker 203, and a bus bar assembly 202. Bus bar assembly 202 includes a plurality of bus bars 206 and a bus bar support 207. Plurality of bus bars 206 includes bus bars 216, 217, 218 and 219 coupled to bus bar support 207. In the exemplary embodiment, circuit breaker 203 is coupled to bus bars 217, 218, and 219 (i.e. the power bus bars) of bus bar assembly 202. Neutral connection device 204 is coupled to bus bar assembly 202 adjacent circuit breaker 203. In particular, neutral connection device 204 is coupled to bus bar 216 (i.e., the neutral bus bar) of bus bar assembly 202. In the exemplary embodiment, neutral connection device 204 is located beneath circuit breaker 203 (i.e., between circuit breaker 203 and bus bar support 207). In alternative embodiments, neutral connection device 204 is coupled to bus bar 216 in any configuration with respect to circuit breaker 203 that enables electrical distribution system 200 to operate as described herein.

In the exemplary embodiment, circuit breaker 203 includes a first end 222, a second end 223, a top, a bottom, and sides, in reference to the orientation shown in FIG. 8. First end 222 is adjacent bus bar assembly 202 and second end 223 is opposite first end 222. Top, bottom, and sides of circuit breaker 203 extend between first end 222 and second end 223.

In the exemplary embodiment, neutral connection device 204 includes a neutral conductor. Further, in the exemplary embodiment, neutral connection device 204 is supported by a support member 232 coupled to a first mounting bracket 234. Additionally, mounting bracket 234 is coupled to bus bar support 207. In alternative embodiments, mounting bracket 234 is coupled to any support structure that enables mounting bracket 234 to operate as described herein. In the exemplary embodiment, support member 232 is a plastic, insulating material. In alternative embodiments, support member 232 may include any insulating material that enables neutral connection device 204 to operate as described herein.

In the exemplary embodiment, neutral connection device 204 includes a first end 208, a second end 210, a casing 212, and a conductive component (substantially similar to conductive component 114). Neutral connection device 204 extends between conductive terminals at first end 208 and second end 210 and forms a current flow path from first end 208 to second end 210. In the exemplary embodiment, neutral connection device 204 is oriented substantially parallel to a bottom surface of circuit breaker 203 to facilitate positioning a lug assembly 230 substantially in vertical alignment with second conductive terminals 226 of circuit breaker 203. In alternative embodiments, neutral connection device 204 may have any dimensions that enable electronic distribution system 200 to operate as described herein. First end 208 is arranged to electrically couple neutral connection device 204 to bus bar 216, and second end 210 is arranged to electrically couple neutral connection device 204 to an electrical load or other electrical device (not shown).

In the exemplary embodiment, lug assembly 230 includes a second conductive terminal 256 that can be easily accessed to electrically couple an electrical load or other electrical device to neutral connection device 204. In particular, in the exemplary embodiment, lug assembly 230 includes multiple power connectors at second conductive terminal 256 to accommodate multiple conductors of varying sizes. For example, lug assembly 230 includes a first power connector 257 and a second power connector 258. Power connectors 257, 258 are located within openings, similar to openings 359 (shown in FIG. 9) within lug assembly 230. The openings are arranged within the lug assembly 230 to receive a power connector of an electrical device to be coupled to neutral connection device 204. In the exemplary embodiment, first power connector 257 and second power connector 258 also include couplers 260 positioned above openings and arranged to secure power connectors of the electrical device within openings. In alternative embodiments, lug assembly 230 includes any configuration that enables neutral connection device 204 to operate as described herein. In the exemplary embodiment, neutral connection device 204 extends alongside circuit breaker 203, such that the length from bus bar assembly 202 to second end 210 of neutral connection device 204 is greater than the length from bus bar assembly 202 to a second end 223 of circuit breaker 203. Accordingly, in the exemplary embodiment, second end 210 of neutral connection device 204 extends from, bus bar assembly 202 beyond second end 223 of circuit breaker 203. In alternative embodiments, neutral connection device 204 has any length that enables neutral connection device 204 to operate as described herein.

In the exemplary embodiment, neutral connection device 204 includes a current transformer 236 that works in conjunction with circuit breaker 203 to provide ground fault protection and/or generate an alarm. In the exemplary embodiment, current transformer 236 is arranged between first end 208 and second end 210 of neutral connection device 204. In particular, in the exemplary embodiment, current transformer 236 is positioned on an underside of neutral connection device 204 opposite circuit breaker 203. Additionally, in the exemplary embodiment, current transformer 236 is positioned between insulating support member 232 and second end 210. In alternative embodiments, current transformer 236 is positioned in any manner with respect to neutral connection device 204 that enables current transformer 236 to operate as described herein.

In another alternative embodiment, neutral connection device 204 contains a ground fault device (not shown) having an output connected to circuit breaker 203 to provide ground fault protection and/or having an output connected to an external ground fault alarm.

In the exemplary embodiment, neutral connection device 204 is physically coupled to circuit breaker 203 such that circuit breaker 203 and neutral connection device 204 are coupleable to bus bar assembly 202 as a unit. Specifically, in the exemplary embodiment, neutral connection device 204 is supported by first mounting bracket 234 and a second mounting bracket 235. Additionally, first mounting bracket 234 and second mounting bracket 235 are coupled to the bottom of circuit breaker 203. Furthermore, first mounting bracket 234 and second mounting bracket 235 are coupled to bus bar support 207. In alternative embodiments, neutral connection device 204 is physically coupled to circuit breaker 203 in any manner that enables electrical distribution system 200 to operate as described herein. For example, in alternative embodiments, neutral connection device 204 and circuit breaker 203 are coupleable to bus bar assembly 202 as separate components. In further embodiments, neutral connection device 204 is integrated with circuit breaker 203 to form a singular unit.

Figure 9:
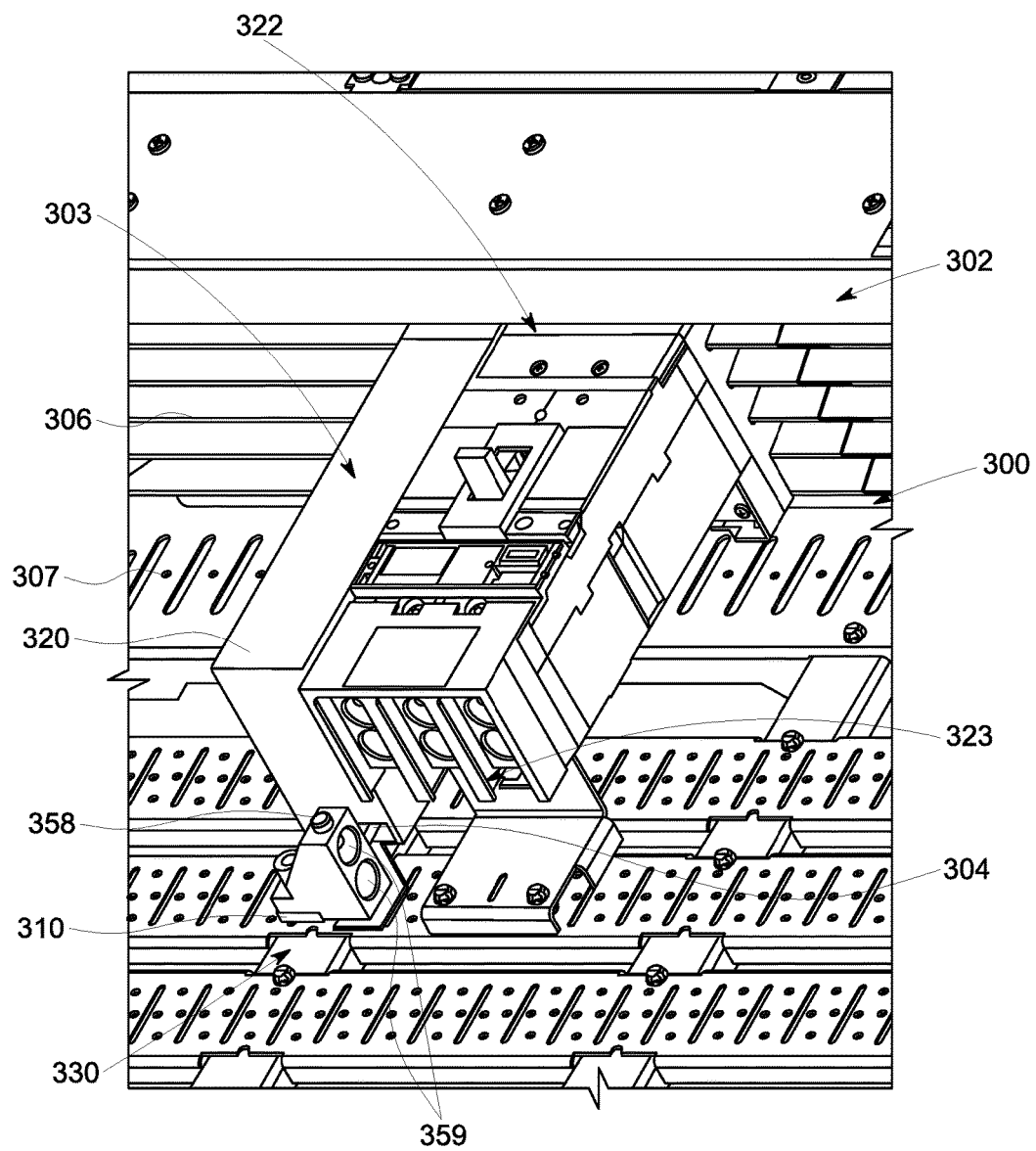
FIG. 9 is a perspective view of an exemplary electrical distribution system including a neutral connection device positioned within a housing.
Figure 10:
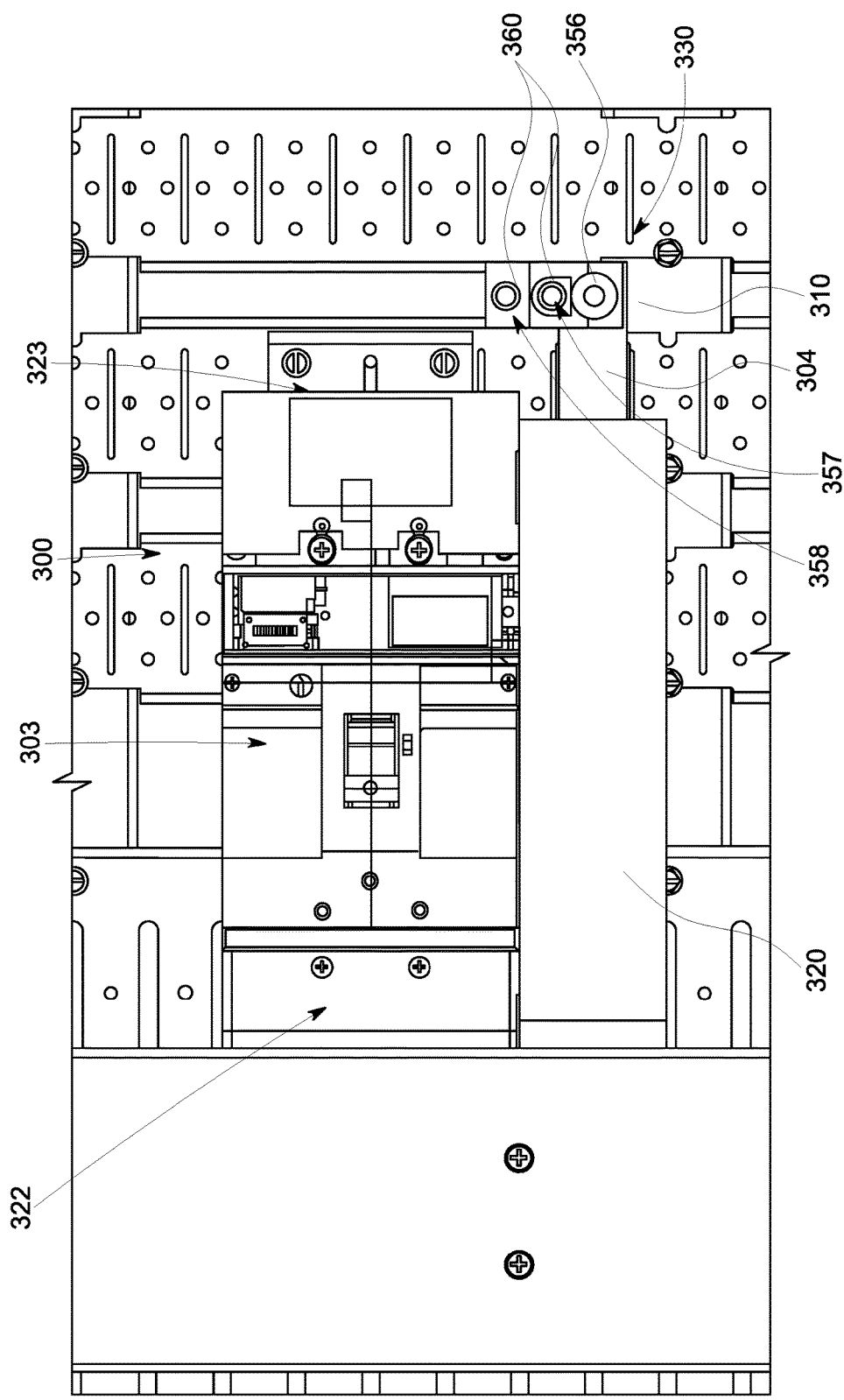
FIG. 10 is a top view of the electrical distribution system shown in FIG. 9.

FIG. 9 is a perspective view of an alternative exemplary electrical distribution system 300 including an alternative neutral connection device 304 positioned within a housing 320. FIG. 10 is a top view of electrical distribution system 300.

Electrical distribution system 300 includes a neutral connection device 304, a circuit breaker 303, and a bus bar assembly 302. Bus bar assembly 302 includes a plurality of bus bars 306 and a bus bar support 307. Bus bars 306 are separated from each other by insulating material. Circuit breaker 303 is coupled to power bus bars 306 of bus bar assembly 302. Neutral connection device 304 is coupled to a neutral bus bar 306 of bus bar assembly 302 adjacent circuit breaker 303. In the exemplary embodiment, neutral connection device 304 is coupled to bus bar assembly 302 beneath circuit breaker 303. In alternative embodiments, neutral connection device 304 is coupled to bus bar assembly 306 in any configuration with respect to circuit breaker 303 that enables electrical distribution system 300 to operate as described herein. In the exemplary embodiment, neutral connection device 304 is positioned within housing 320. Additionally, in the exemplary embodiment, housing 320 is coupled to a side of circuit breaker 303.

In the exemplary embodiment, neutral connection device 304 includes a lug assembly 330. Specifically, in the exemplary embodiment, lug assembly 330 includes a conductive terminal or lug 356 that can be easily accessed to terminate a field neutral conductor of an electrical load or other electrical devices. In particular, in the exemplary embodiment, lug assembly 330 includes multiple power connectors to accommodate multiple conductors of varying sizes. For example, lug assembly 330 includes a first power connector 357 and a second power connector 358. Conductors are positioned in openings 359 defined in lug assembly 330 to facilitate making electrical connections to first power connector 357 and second power connector 358. In the exemplary embodiment, first power connector 357 and second power connector 358 also include couplers 360 positioned above openings 359 and arranged to secure electrical connections to first and second power connectors 357 and 358 within openings 359. In alternative embodiments, lug assembly 330 includes any configuration that enables neutral connection device 304 to operate as described herein. In the exemplary embodiment, first end (not shown) of neutral connection device 304 is electrically coupled to bus bar assembly 302 (and specifically, to a neutral bus bar 306). Additionally, neutral connection device 304 extends beyond circuit breaker 303, such that a distance from bus bar assembly 302 to a second end 310 of neutral connection device 304 is greater than a distance from bus bar assembly 302 to a second end 323 of circuit breaker 303. Accordingly, in the exemplary embodiment, second end 310 of neutral connection device 304 extends beyond second end 323 of circuit breaker 303. In alternative embodiments, neutral connection device 304 has any length that enables neutral connection device 304 to operate as described herein.

In the exemplary embodiment, neutral connection device 304 is physically coupled to circuit breaker 303 such that circuit breaker 303 and neutral connection device 304 are coupleable to bus bar assembly 302 as a unit. Specifically, in the exemplary embodiment, neutral connection device 304 is supported by housing 320. Additionally, housing 320 is coupled to a side of circuit breaker 303. In alternative embodiments, neutral connection device 304 is coupleable to circuit breaker 303 in any manner that enables electrical distribution system 300 to operate as described herein. For example, in alternative embodiments, neutral connection device 304 and circuit breaker 303 are coupleable to bus bar assembly 302 as separate components. In further embodiments, neutral connection device 304 is integrated with circuit breaker 303 to form a singular unit.

Figure 11:
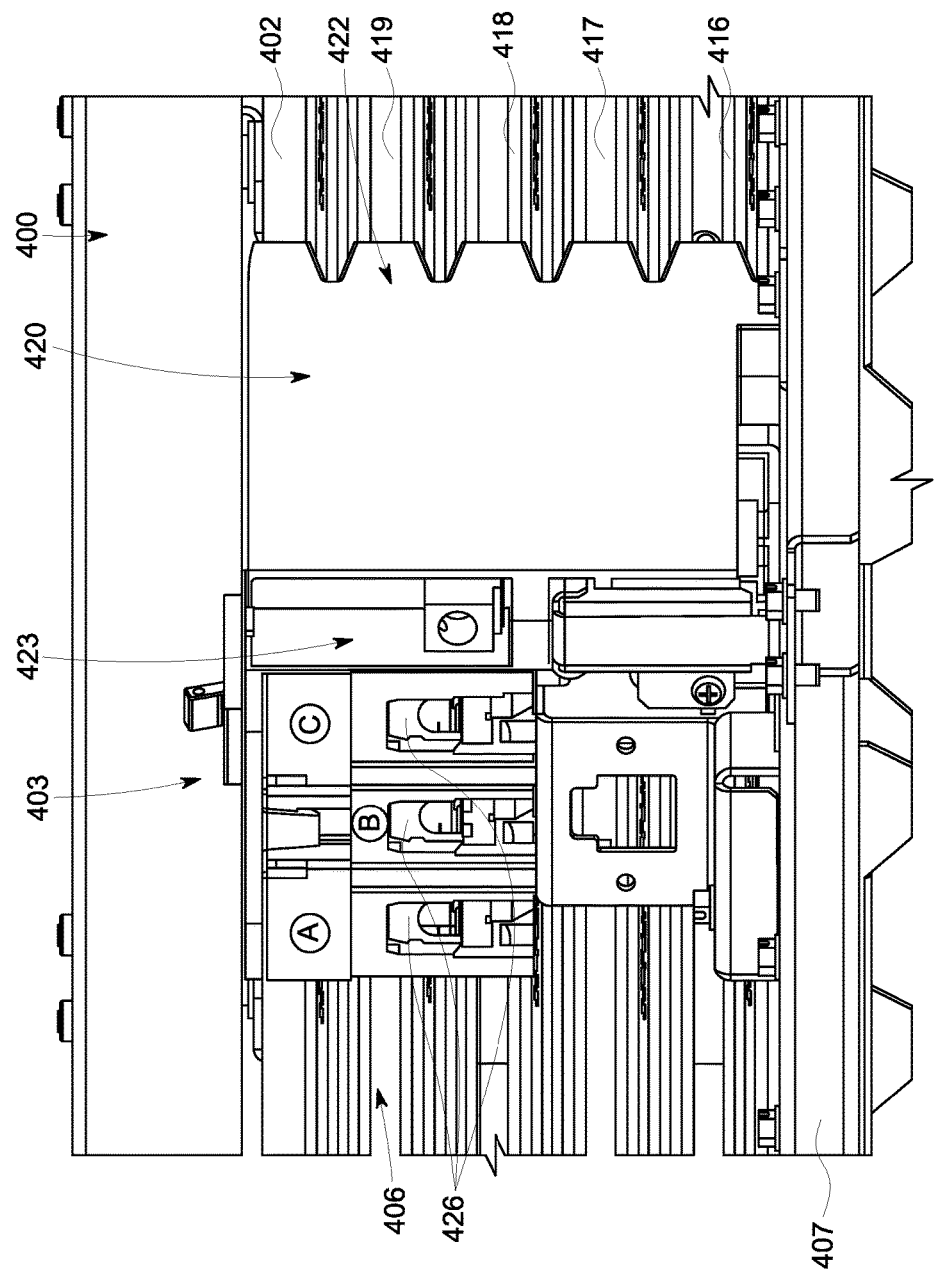
FIG. 11 is a perspective view of an exemplary electrical distribution system including a neutral connection device positioned within a housing.
Figure 12:
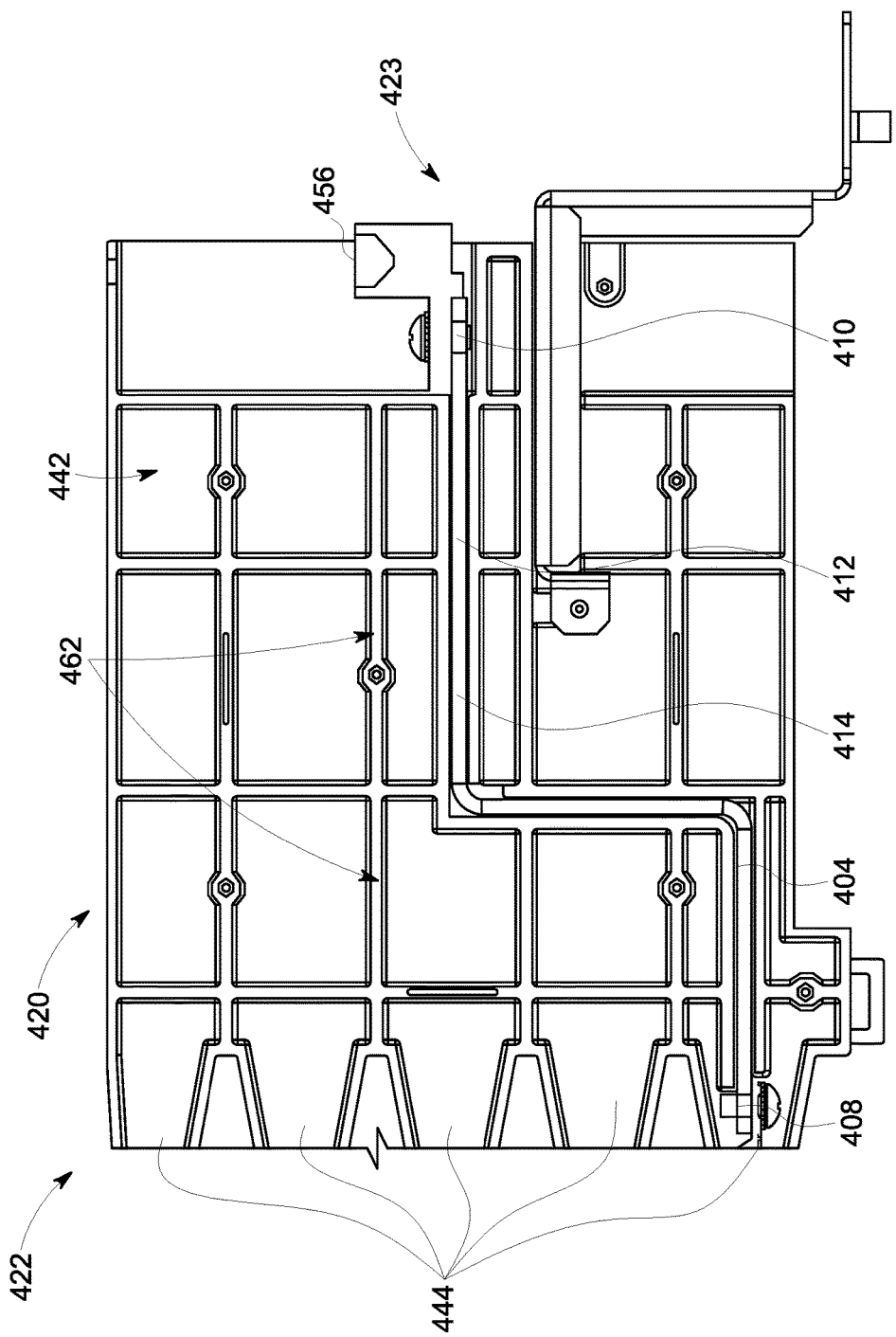
FIG. 12 is a sectional side view of the neutral connection device positioned within housing shown in FIG. 11 without the electrical device.

FIG. 11 is a perspective view of an alternative exemplary electrical distribution 400 system including an alternative neutral connection device 404 positioned within a casing, or more precisely, a housing 420. FIG. 12 is a sectional side view of neutral connection device 404. Electrical distribution system 400 includes neutral connection device 404, a circuit breaker 403, and a bus bar assembly 402. In the exemplary embodiment, bus bar assembly 402 includes a plurality of bus bars 406 and a bus bar support 407 (e.g., a portion of a panelboard). Bus bars 406 are separated from each other by insulating material, and include bus bars 416, 417, 418 and 419 coupled to bus bar support 407.

In the exemplary embodiment, neutral connection device 404 includes a first end 408, a second end 410, housing 420, and a conductive component 414. Conductive component 414 extends between conductive terminals at first end 408 and second end 410 and forms a current flow path from first end 408 to second end 410. First end 408 is configured to electrically couple neutral connection device 404 to bus bar assembly 402. Second end 410 is configured to electrically couple neutral connection device 404 to an electrical load or other electrical device. In the exemplary embodiment, second end 410 includes second terminal 456 that can be easily accessed to terminate a field neutral conductor of an electrical load or other electrical devices. First end 408 is coupled to a neutral bus bar 416 of bus bar assembly 402, such that current flows through bus bar assembly 402 to neutral connection device 404 during operation of electrical distribution system 400. In alternative embodiments, neutral connection device 404 is coupled to bus bar assembly 402 in any manner that enables electrical distribution system 400 to operate as described herein. Further, in the exemplary embodiment, neutral connection device 404 is supported by housing 420.

Housing 420 defines an interior space 442 (shown in FIG. 12) arranged to receive at least one electrical device. Moreover, housing 420 is arranged to receive different electrical devices within interior space 442 to facilitate different electrical devices coupling to bus bar assembly 402 (shown in FIG. 11). For example, interior space 442 is arranged to receive neutral connection device 404 and circuit breaker 403.

In the exemplary embodiment an insert 462 is located within interior space 442 of housing 420 and is arranged to support neutral connection device 404. In the exemplary embodiment, insert 462 is a rib structure that includes a plurality of intersecting ribs extending along an interior surface of housing 420. In alternative embodiments, insert 462 may include any structure which enables insert 462 to function as described herein. For example, in alternative embodiments, insert 462 may include a mounting plate (not shown). In the exemplary embodiment, insert 462 is integrally formed with housing 420. In alternative embodiments, insert 462 is removably coupled to housing 420.

In the exemplary embodiment, conductive component 414 extends through interior space 442 of housing 420. Specifically, in the exemplary embodiment, neutral connection device 404 extends through at least one ports 444 defined in housing 420 and along the rib structure of insert 462. Further, in the exemplary embodiment, conductive component 414 extends through the rib structure of insert 462 such that second conductive terminal 456 of neutral connection device is substantially aligned with second conductive terminals 426 of circuit breaker 403.

Ports 444 are arranged to facilitate connection of electrical devices supported within housing 420. Further, ports 444 are arranged to facilitate electrically coupling bus bars 406 to electrical devices positioned within housing 420. In the exemplary embodiment, housing 420 includes five ports 444. In further alternative embodiments, ports 444 may include any number of ports 444 which enable housing 420 to operate as described herein. In the exemplary embodiment, ports 444 define a first end 422 of housing 420. Additionally, in the exemplary embodiment, housing 420 has second end 423 opposite first end 422.

An exemplary technical effect of the methods, systems, and apparatus described herein includes at least one of: (a) reducing cost and time required to assemble electrical distribution systems; (b) increasing compatibility with ground fault capable devices; (c) enabling circuit breaker assemblies to have installed ground fault capable unit; (d) reducing operator exposure to live components; (e) standardizing neutral connections; (f) increasing access to neutral components; (g) increasing device density; (h) providing a neutral connection that is modular and connects to different devices; and (i) increasing the customization options for electrical distribution systems.

Exemplary embodiments of electrical distribution apparatuses and methods of assembling electrical distribution apparatuses are described above in detail. The electrical distribution apparatuses and methods are not limited to the specific embodiments described herein but, rather, components of the electrical distribution apparatuses and/or operations of the methods may be utilized independently and separately from other components and/or operations described herein. Further, the described components and/or operations may also be defined in, or used in combination with, other systems, methods, and/or devices, and are not limited to practice with only the electrical distribution systems and apparatuses described herein.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical distribution system comprising:
    a bus bar assembly comprising:
        a plurality of bus bars comprising a neutral bus bar and a plurality of power bus bars, wherein an insulating material is located between adjacent bus bars of said plurality of bus bars;
    a circuit breaker coupled to said bus bar assembly and comprising a first end and a second end opposite said first end, said first end comprising a plurality of first conductive terminals electrically coupled to respective power bus bars of said plurality of power bus bars, said second end comprising a plurality of second conductive terminals, each second conductive terminal of said plurality of second conductive terminals electrically coupled to an associated first conductive terminal of said plurality of first conductive terminals, said plurality of second conductive terminals located a first distance from said plurality of power bus bars; and
    a neutral connection device coupled to said bus bar assembly, said neutral connection device comprising:
        a first end comprising a first conductive terminal electrically coupled to said neutral bus bar;
        a second end opposite said neutral connection device first end, said second end comprising a second conductive terminal operable to electrically couple said neutral connection device to at least one electrical device; and
        a conductive component extending between and electrically coupling said neutral connection device first and second conductive terminals, said neutral connection device second conductive terminal located a second distance from said neutral bus bar, the second distance one of greater than the first distance and equal to the first distance.

2. The electrical distribution system of claim 1, wherein said neutral connection device comprises a casing substantially enclosing said conductive component, said casing comprising a first portion detachably coupled to a second portion.

3. The electrical distribution system of claim 2, wherein said casing defines a first opening that facilitates access to said neutral connection device first conductive terminal and a second opening that facilitates access to said neutral connection device second conductive terminal.

4. The electrical distribution system of claim 2, wherein said casing further comprises at least one structural member that supports said conductive component within said casing.

5. The electrical distribution system of claim 1, wherein said conductive component comprises an S-shaped portion.

6. The electrical distribution system of claim 1, wherein said bus bar assembly further comprises a bus bar support, and wherein said neutral connection device is located between said circuit breaker and said bus bar support.

7. The electrical distribution system of claim 1, wherein said bus bar assembly further comprises a bus bar support, and wherein said electrical distribution system further comprises:
    a mounting bracket coupled to said bus bar support; and
    a support member coupled to said mounting bracket, said support member supporting said neutral connection device.

8. The electrical distribution system of claim 1, wherein said neutral connection device comprises a current transformer positioned on a side of said neutral connection device opposite said circuit breaker.

9. The electrical distribution system of claim 1, wherein said neutral connection device is physically coupled to said circuit breaker.

10. The electrical distribution system of claim 1, further comprising a housing defining an interior space, wherein said neutral connection device is positioned within said housing, said neutral connection device supported by a rib structure comprising a plurality of ribs extending from a surface of said housing.

11. The electrical distribution system of claim 1, wherein said second conductive terminal comprises a lug assembly comprising a first power connector and a second power connector.

12. A method of assembling an electrical distribution system including a bus bar assembly, the bus bar assembly including a plurality of bus bars including a neutral bus bar and a plurality of power bus bars, an insulating material located between adjacent bus bars of the plurality of bus bars, said method comprising:
    coupling a circuit breaker to the bus bar assembly, the circuit breaker including a first end and a second end opposite the first end, the first end including a plurality of first conductive terminals electrically coupled to respective power bus bars of the plurality of power bus bars, the second end including a plurality of second conductive terminals, each second conductive terminal of the plurality of second conductive terminals electrically coupled to an associated first conductive terminal of the plurality of first conductive terminals, the plurality of second conductive terminals located a first distance from the plurality of power bus bars; and
    coupling a neutral connection device to the bus bar assembly, the neutral connection device including a first end including a first conductive terminal electrically coupled to the neutral bus bar, a second end opposite the neutral connection device first end, the second end including a second conductive terminal operable to electrically couple the neutral connection device to at least one electrical device, and a conductive component extending between and electrically coupling the neutral connection device first and second conductive terminals, the neutral connection device second conductive terminal located a second distance from the neutral bus bar, the second distance one of greater than the first distance and equal to the first distance.

13. The method of claim 12, wherein coupling a neutral connection device comprises coupling a neutral connection device that includes a casing substantially enclosing the conductive component, the casing including a first portion detachably coupled to a second portion.

14. The method of claim 13, wherein the casing defines a first opening that facilitates access to the neutral connection device first conductive terminal and a second opening that facilitates access to the neutral connection device second conductive terminal.

15. The method of claim 13, wherein the casing further includes at least one structural member that supports the conductive component within the casing.

16. The method of claim 12, wherein coupling a neutral connection device comprises coupling a neutral connection device in which the conductive component includes an S-shaped portion.

17. The method of claim 12, wherein the bus bar assembly further includes a bus bar support, and wherein coupling a neutral connection device comprises coupling the neutral connection device such that the neutral connection device is located between the circuit breaker and the bus bar support.

18. The method of claim 17, further comprising:
coupling a mounting bracket to the bus bar support; and
coupling a support member to the mounting bracket, the support member supporting the neutral connection device.

19. The method of claim 12, further comprising physically coupling the neutral connection device to the circuit breaker.

20. The method of claim 19, wherein the circuit breaker and the neutral connection device are coupled to the bus bar assembly simultaneously.

* * * * *